United States Patent
Lin et al.

(10) Patent No.: US 12,260,917 B2
(45) Date of Patent: Mar. 25, 2025

(54) STORAGE DEVICE FOR GENERATING IDENTITY CODE AND IDENTITY CODE GENERATING METHOD

(71) Applicant: MACRONIX INTERNATIONAL CO., LTD., Hsinchu (TW)

(72) Inventors: Yu-Hsuan Lin, Taichung (TW); Dai-Ying Lee, Hsinchu County (TW); Ming-Hsiu Lee, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 18/623,116

(22) Filed: Apr. 1, 2024

(65) Prior Publication Data

US 2024/0242767 A1    Jul. 18, 2024

Related U.S. Application Data

(62) Division of application No. 17/388,079, filed on Jul. 29, 2021, now Pat. No. 11,984,166.

(60) Provisional application No. 63/185,364, filed on May 7, 2021.

(51) Int. Cl.
*G11C 29/40* (2006.01)
*G11C 16/10* (2006.01)
*G11C 16/26* (2006.01)
*G11C 16/34* (2006.01)

(52) U.S. Cl.
CPC ......... *G11C 16/102* (2013.01); *G11C 16/26* (2013.01); *G11C 16/3459* (2013.01); *G11C 29/40* (2013.01); *G11C 2029/4002* (2013.01)

(58) Field of Classification Search
None
See application file for complete search history.

(56) References Cited

U.S. PATENT DOCUMENTS

| | | |
|---|---|---|
| 9,183,140 B2 | 11/2015 | Werner et al. |
| 11,218,306 B2 | 1/2022 | Maes et al. |
| 2014/0040338 A1 | 2/2014 | Van Der Sluis et al. |
| 2014/0063910 A1 | 3/2014 | Yi |

(Continued)

FOREIGN PATENT DOCUMENTS

| | | |
|---|---|---|
| CN | 106355409 A | 1/2017 |
| CN | 107924645 A | 4/2018 |
| TW | 201241615 A | 10/2012 |

*Primary Examiner* — Alfredo Bermudez Lozada
(74) *Attorney, Agent, or Firm* — McClure, Qualey & Rodack, LLP (57) ABSTRACT

A storage device for generating an identity code, includes a first storage circuit, a second storage circuit and a reading circuit. The first storage circuit stores several first data having several bits. The second storage circuit stores several second data having several bits. The reading circuit reads the second data from the second storage circuit to form a first sequence, and simultaneously reads the first data from the first storage circuit to form a second sequence. The reading circuit includes a processing circuit which simultaneously receives the first sequence and the second sequence, selects a first portion of the second sequence to form a target sequence according to the first sequence, and outputs the target sequence to serve as an identity code. Logical values of the bits of the first data and the second data are randomly distributed or pre-defined by a user.

10 Claims, 13 Drawing Sheets

(56) References Cited

U.S. PATENT DOCUMENTS

2019/0358515 A1 11/2019 Tran et al.
2021/0314176 A1* 10/2021 Cambou ............... H04L 9/0866

* cited by examiner

STORAGE DEVICE FOR GENERATING IDENTITY CODE AND IDENTITY CODE GENERATING METHOD

This application is a divisional application of U.S. application Ser. No. 17/388,079, filed at Jul. 29, 2021, which claims the benefit of U.S. provisional application Ser. No. 63/185,364, filed May 7, 2021, the subject matter of which is incorporated herein by reference.

TECHNICAL FIELD

The present disclosure relates to a storage device and an operating method thereof, and in particular, to a storage device for generating a unique identity code and a method for generating the unique identity code.

BACKGROUND

With the progress of technology, various types of electronic devices, such as personal computers, mobile phones, headsets, etc., have been widely used in daily life. Among these devices, personal computers or mobile phones usually store important personal information with personal privacy, and personal computers or mobile phones often process financial transactions. Therefore, strict security mechanisms are required to ensure privacy of personal information and transaction security. In a common security mechanism, each electronic device is given a unique identity code (ID code), and each electronic device can be confirmed according to the identity code to check its legality.

The application of the unique identity code is not limited to terminal devices such as personal computers or mobile phones, but can also be applied to semiconductor chips within such terminal devices. A unique identity code is stored in each chip so as to identify the chip. In other words, the unique identity code can serve as a fingerprint of the chip.

In order to ensure the identity code with its uniqueness and prevent the identity code from being the same with those of other devices or chips, physically unclonable characteristics of the hardware components can be used to generate the identity code. This type of identity code is called physically unclonable function code (PUF code).

However, factors in the manufacturing process or operating environment of the hardware components (such as environmental temperature) often lead to defects or variations of parameters in the hardware components, that may in turn cause error bits in the identity codes stored in the hardware components so that correctness and uniqueness of the identity code may be deteriorated. The above issues refer to technical problems encountered by the physically unclonable function codes of the prior art.

SUMMARY

In order to overcome the above-mentioned technical problems of the physical unclonable function codes of the prior art, the present disclosure provides a technical solution to store two sets of data (first data and second data) in a storage device respectively, and select the first portion of the first data according to the second data to generate the identity code.

According to one embodiment, the present disclosure provides a storage device for generating an identity code, including a first storage circuit, a second storage circuit and a reading circuit. The first storage circuit is used to store a plurality of first data, and the first data have a plurality of bits. The second storage circuit is used to store a plurality of second data, and the second data have a plurality of bits. The reading circuit is used to read the second data from the second storage circuit to form a first sequence, and simultaneously read the first data from the first storage circuit to form a second sequence. The reading circuit includes a processing circuit, which is used to simultaneously receive the first sequence and the second sequence, select a first portion of the second sequence to form a target sequence according to the first sequence, and output the target sequence to serve as an identity code. Logical values of the bits of the first data are randomly distributed, and logical values of the bits of the second data are pre-defined by a user or randomly distributed.

According to another embodiment, the present disclosure provides an identity code generating method, including the following steps. The second data are read from the second storage circuit to form a first sequence, wherein the second data have a plurality of bits, logic values of the bits are pre-defined by a user or randomly distributed. The first data are read from the first storage circuit to form a second sequence, wherein the first data have a plurality of bits, logic values of the bits are randomly distributed. The first sequence and the second sequence are transmitted to a processing circuit simultaneously. A first portion of the second sequence is selected by the processing circuit, according to the first sequence. The target sequence is outputted to serve as an identity code.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1A:
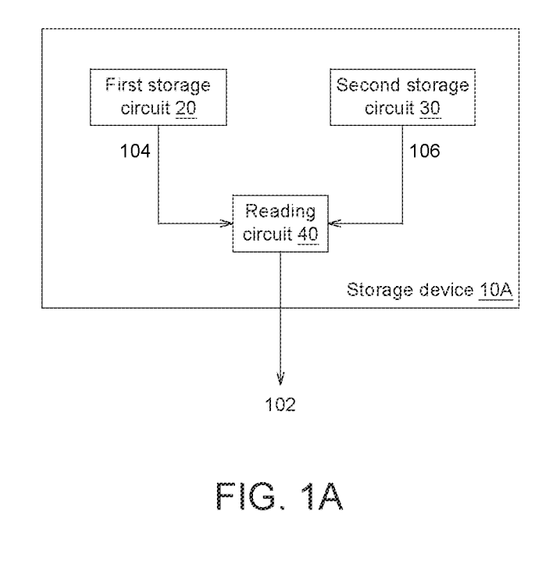
FIG. 1A is a block diagram of the storage device for generating an identity code according to the first embodiment of the present disclosure.

FIG. 1A is a block diagram of the storage device 10A for generating an identity code 102 according to the first embodiment of the present disclosure. Referring to FIG. 1A, the storage device 10A of the first embodiment includes a first storage circuit 20, a second storage circuit 30 and a reading circuit 40. In the storage device 10A of the first embodiment, the first storage circuit 20 and the second storage circuit 30 are storage circuits which are physically separated from each other. The reading circuit 40 may be configured to read data from the first storage circuit 20 and the second storage circuit 30 respectively, and process these data to generate an identify code 102.

Figure 1B:
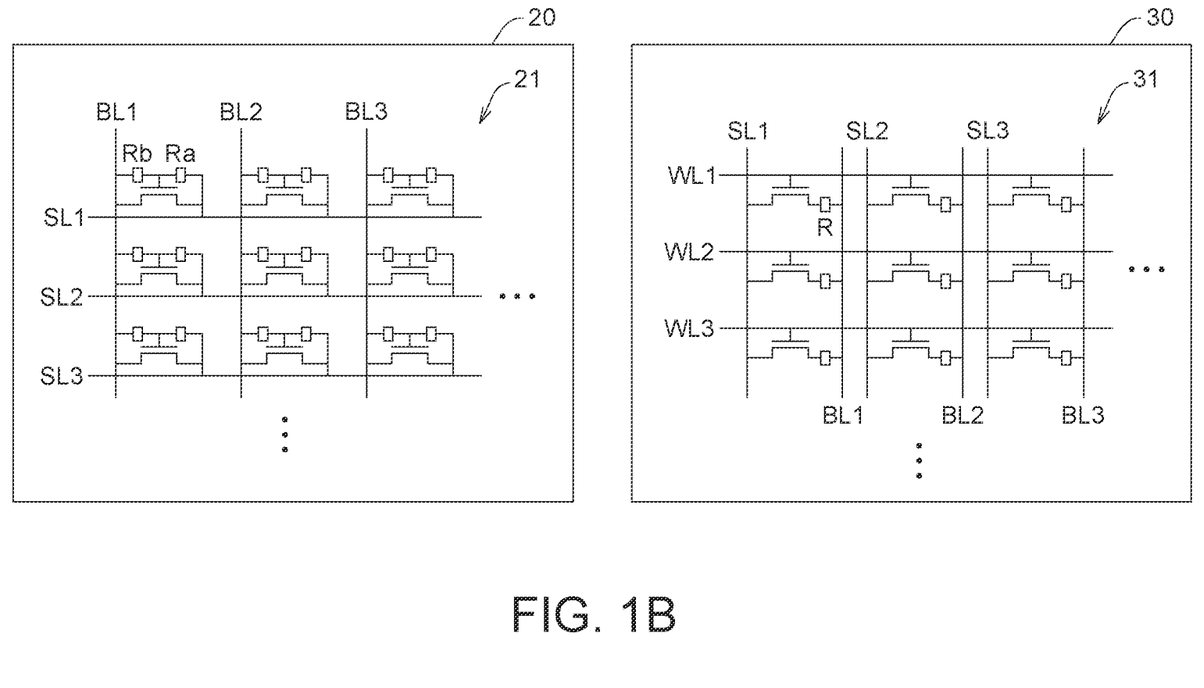
FIG. 1B are circuit diagrams of the memory array of the first storage circuit and the memory array of the second storage circuit according to the first embodiment of the present disclosure.

More particularly, FIG. 1B are circuit diagrams of the memory array 21 of the first storage circuit 20 and the memory array 31 of the second storage circuit 30 according to the first embodiment of the present disclosure. Referring to FIG. 1B, the memory array 21 of the first storage circuit 20 may refer to, for example, a random access memory (RAM) array of the type of one transistor and two resistors (1T2R, 1Transistor+2Re). The resistors Ra and Rb may determine the voltage of the gate of the transistor and may thus determine logic value as "1" or "0" stored in memory cells of the memory array 21.

On the other hand, the memory array 31 of the second storage circuit 30 refers to a programmable memory array. The logic values stored in memory cells of the memory array 31 can be programmed according to user's definition. The memory array 31 of the second storage circuit 30 may refer to a RAM array of a type of one transistor and one resistor (1T1R, 1Transistor+1Re).

Memory types of the first storage circuit 20 and the second storage circuit 30 may also include static random access memory (SRAM) or read-only memory (ROM), such as mask ROM, fuse ROM, and anti-fuse ROM. Or, may include high precision NVM, charge storage memory, floating gate memory (FG), charge trapping memory, Silicon-Oxide-Nitride-Oxide-Silicon memory (SONOS), variable resistive memory (ReRAM), phase change memory (PCM), magnetic resistive random access memory (MRAM), ferroelectric tunneling memory (FTJ) and Ferroelectric random access memory (FeRAM), etc.

Figure 1C:
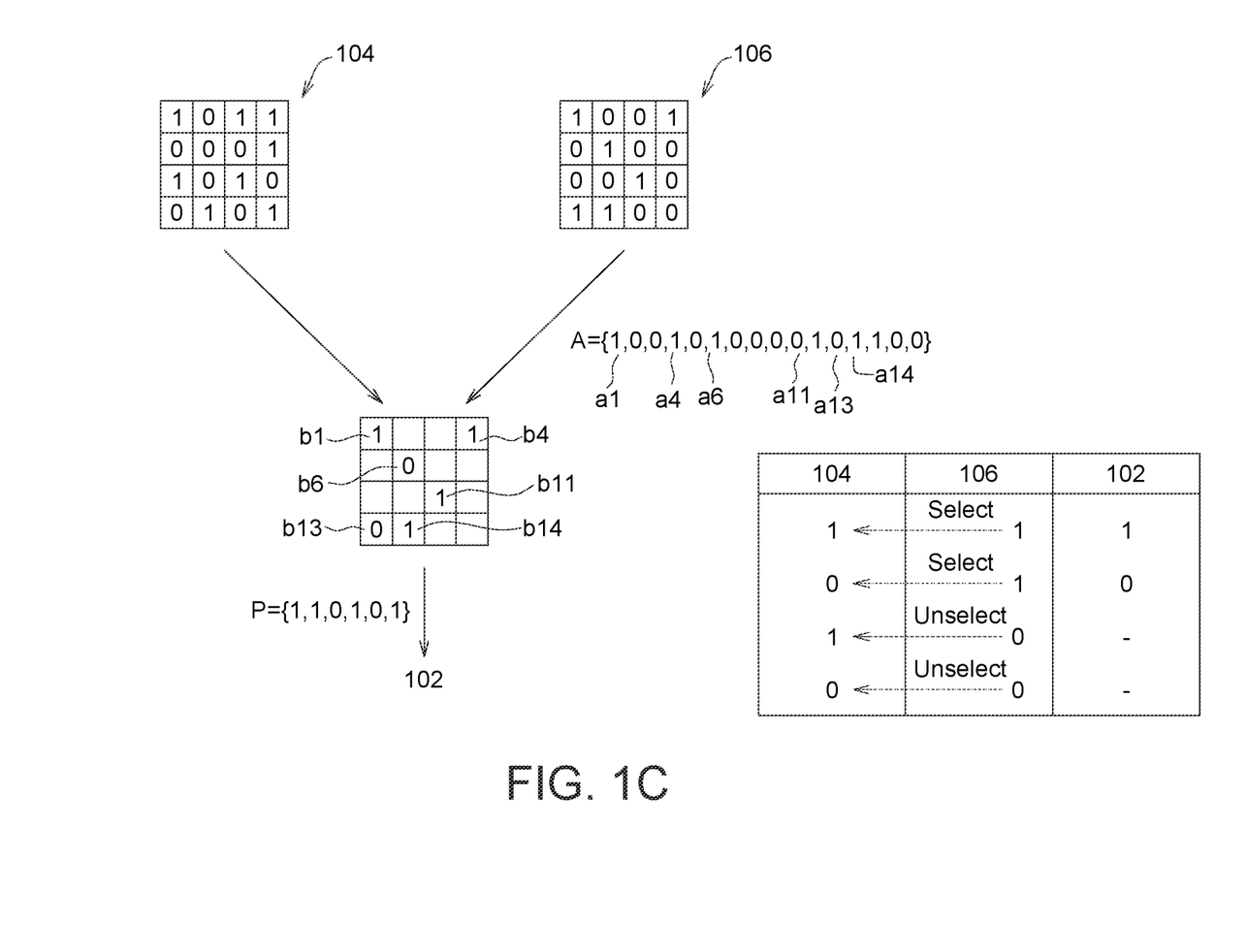
FIGS. 1C and 1D are schematic diagrams illustrating the operation of the storage device to generate an identity code according to the first embodiment of the present disclosure.
Figure 1D:
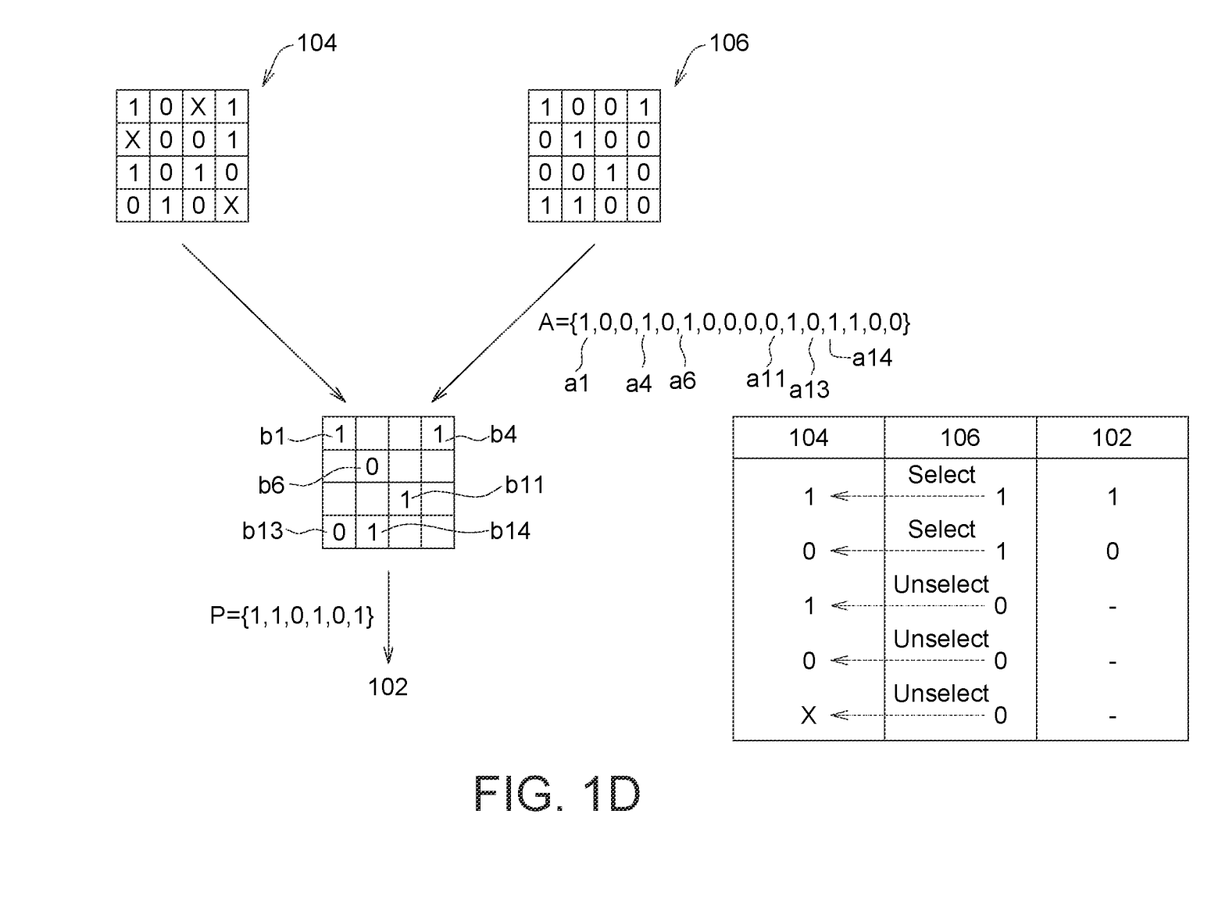
Figure 7:
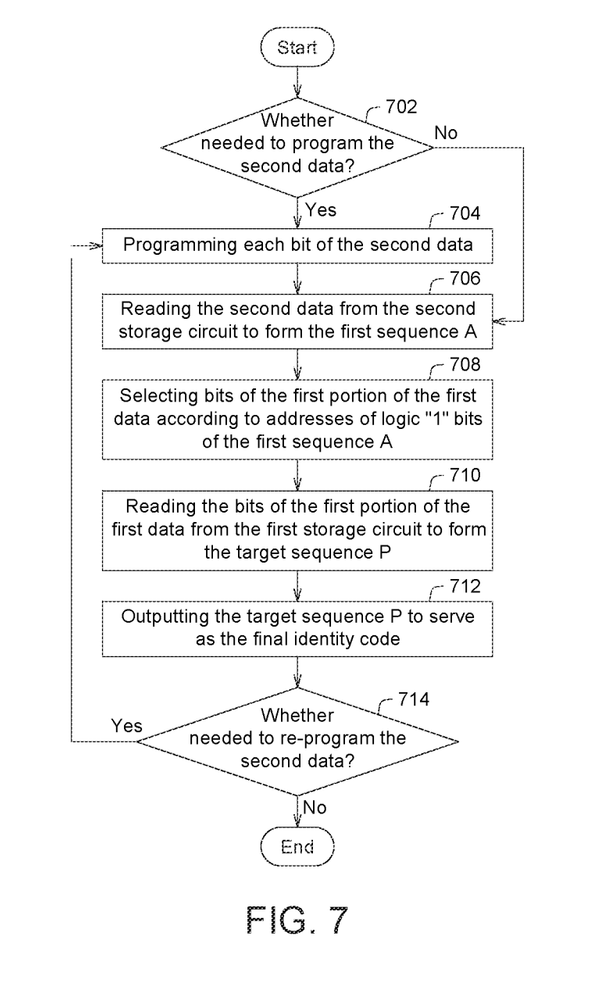
FIG. 7 is a flowchart of the identity code generating method according to the first embodiment of the present disclosure.

FIGS. 1C and 1D are schematic diagrams illustrating the operation of the storage device 10A to generate an identity code 102 according to the first embodiment of the present disclosure, and FIG. 7 is a flowchart of the identity code generating method 700 according to the first embodiment of the present disclosure. First, referring to FIG. 1C (accompanied with FIG. 1A), the first storage circuit 20 may be configured to store a plurality of first data 104. The first data 104 may include, for example, sixteen bits {1, 0, 1, 1, 0, 0, 0, 1, 1, 0, 1, 0, 0, 1, 0, 1}, which are binary logic values. The first data 104 may be stored in sixteen (4×4) memory cells of the memory array 21 of the first storage circuit 20 sequentially and in order. The first data 104 may serve as "information", that is, the first data 104 may serve as contents of the subsequently generated identity code 102. However, in the technical solutions of the present disclosure, the sixteen bits {1, 0, 1, 1, 0, 0, 0, 1, 1, 0, 1, 0, 0, 1, 0, 1} of the original first data 104 may not form the final identity code 102 yet. After selecting bits of a first portion of the first data 104 by the second data 106, the selected bits of the first data 104 can serve as the final identity code 102.

In contrast to the usage of the first data 104 as "information", the second data 106 may serve as "address". According to the address provided by the second data 106, the first portion of the first data 104 may be selected to form the final identity code 102. In the first storage device 10A of the first embodiment, the first data 104 may be stored in the first storage circuit 20, while the second data 106 may be stored in the second storage circuit 30. In other words, the first data 104 and the second data 106 are stored in different storage circuits, physically. The quantity of the second data 106 may be equal to that of the first data 104. The second data 106 may also include sixteen bits of binary logic values. The sixteen bits of the second data 106 may be {1, 0, 0, 1, 0, 1, 0, 0, 0, 0, 1, 0, 1, 1, 0, 0}. Similarly, the second data 106 may be sequentially stored in 4×4 memory cells of the memory array 31 of the second storage circuit 30, in order. The sixteen bits of the second data 106 may correspond to the sixteen bits of the first data 104 in a manner of one-to-one correspondence. Logic "1" bits of the second data 106 may correspond to selected bits of the first data 104. On the other hand, the bits of the first data 104, which correspond to logic "0" bits of the second data 106, are not selected. The selected portion of the first data 104 may refer to "first portion", and the un-selected portion of the first data 104 may refer to "second portion".

In the operation of the storage device 10A of the first embodiment, the reading circuit 40 may read the second data 106 from the second storage circuit 30. The read-out second data 106 may form a first sequence A. The first sequence A may be expressed as {1, 0, 0, 1, 0, 1, 0, 0, 0, 0, 1, 0, 1, 1, 0, 0}, and bits of logic value "1" in the first sequence A may serve as selecting addresses. Also referring to FIG. 7, the above-mentioned operation of the storage device 10A may correspond to the step 706 of the identity code generating method 700 of the first embodiment: reading the second data 106 from the second storage circuit 30 to form the first sequence A.

Next, bits of the first portion of the first data 104 may be selected according to the bits of logic value "1" of the first sequence A. On the other hand, bits of the second portion of the first data 104, which correspond to addressed of bits of logic value "0" of the first sequence A, may be discarded and not selected. For example, bits of logic value "1" of the first sequence A are bits a1, a4, a6, a11, a13 and a14. Furthermore, bits b1, b4, b6, b11, b13 and b14 of the first portion of the first data 104 are selected, which correspond to address of the bits a1, a4, a6, a11, a13 and a14 of the first sequence A. Also referring to FIG. 7, the above-mentioned operation of the storage device 10A may correspond to the step 708 of the identity code generating method 700: selecting bits of the first portion of the first data 104 according to address of the bits of logic value "1" of the first sequence A.

Next, the reading circuit 40 may read bits b1, b4, b6, b11, b13 and b14 of the first portion of the first data 104 from the first storage circuit 20 to form a target sequence P. The target sequence P may be expressed as {1, 1, 0, 1, 0, 1}, and the target sequence P may serve as the final identity code 102. Also referring to FIG. 7, the above-mentioned operation of the storage device 10A may correspond to the step 710 of the identity code generating method 700: reading bits of the first portion of the first data 104 from the first storage circuit 20 to form the target sequence P, and correspond to the step 712: outputting the target sequence P to serve as the final identity code 102.

In contrast to bits b1, b4, b6, b11, b13 and b14 of the selected first portion of the first data 104, on the other hand, the other bits b2, b3, b5, b7, b8, b9, b10, b12, b15, b16 of the second portion of the first data 104 may be discarded and not selected.

For the storage device 10A of the first embodiment, logic value stored in the second storage circuit 30 may be programed by user in advance, so as to pre-define bits of logic value "1" in the second data 106. In other words, the user may pre-define address to select which bits of the first data 104 and take these selected bits as the final identity code 102.

Variations may appear in the physical characteristics of the hardware components of the first storage circuit 20. For example, if the hardware components of the first storage circuit 20 are static random access memory, variations due to mismatch between NMOS transistors and PMOS transistors. If the hardware component of the first storage circuit 20 is a non-volatile memory (e.g., variable resistance memory, phase change memory or floating gate memory), the programming state of the memory is unpredictable. Based on the variations of the hardware components of the first storage circuit 20, logical value of each bit of the first data 104 stored in the first storage circuit 20 is randomly distributed, therefore the logical value of each bit of the first data 104 will not be the same as that of another storage device. Hence, the target sequence P={1, 1, 0, 1, 0, 1} obtained by selecting the first portion of the first data 104 may achieve uniqueness and can serve as the identity code. The identity code 102 may be also expressed as {1, 1, 0, 1, 0, 1}.

In an example of another aspect, referring to FIG. 1D, the hardware component of the first storage circuit 20 may have defects (e.g., variations in component parameters caused by change of temperature) and hence some bits of the first data 104 may be error bits or insufficient margin bits. For example, memory cells in address (1,3), (2,1), (3,3) and (4,4) of the memory array 21 of the first storage circuit 20 may have defects, that result in error bits "x" of the first data 104 stored in address (1,3), (2,1), (3,3) and (4,4) of the memory array 21. In the technical solution of the present disclosure, the first portion of the first data 104 is selected as the final identity code 102 according to the address provided by the second data 106, and the second portion of the first data 104 is discarded and not selected. The error bits "X" of the first data 104 correspond to address (1,3), (2,1) and (4,4) of memory array 31 of the second storage circuit 30, and bits of the second data 106 stored in address (1,3), (2,1) and (4,4) of memory array 31 all have logic value "0". Therefore, the error bits "x" of the first data 104 belong to the second portion and will be discarded and not selected, the error bits "x" of the first data 104 will not affect the target sequence {1, 1, 0, 1, 0, 1} and the final identity code 102. In other words, address provided by the second data 106 can filter out the error bits "x" in the first data 104, hence the generating mechanism of identity code 102 of the present disclosure may have error tolerance to tolerate error bits "x" in the first data 104.

Figure 2A:
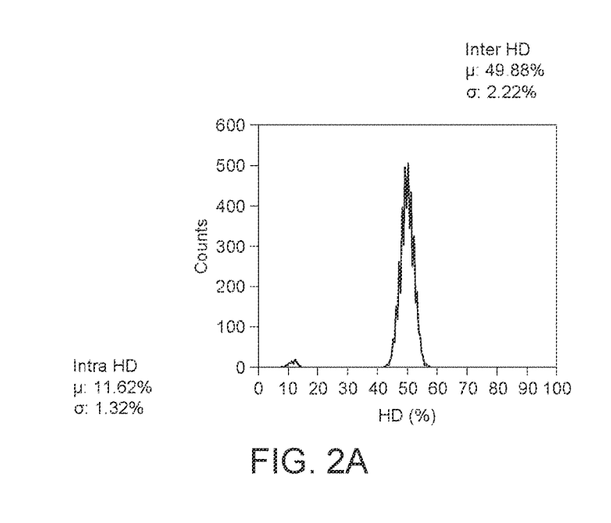
FIGS. 2A and 2B are schematic diagrams of characteristic analysis of an identity code generated in a simulation according to the first embodiment of the present disclosure.
Figure 2B:
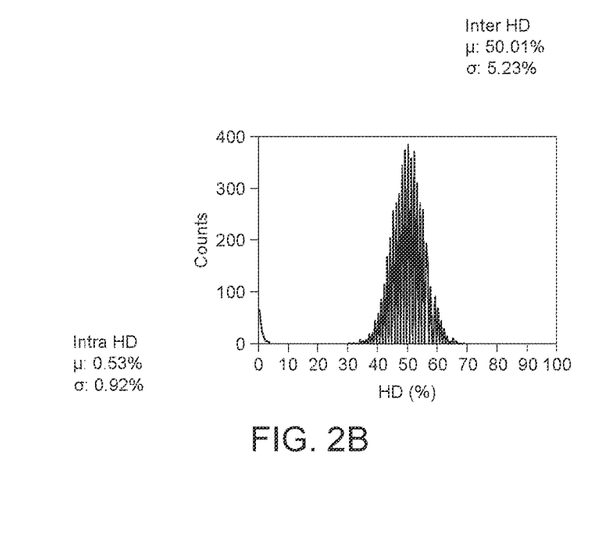

FIGS. 2A and 2B are schematic diagrams of characteristic analysis of an identity code 102 generated in a simulation according to the first embodiment of the present disclosure. The amount of the first data 104 stored in the first storage circuit 20 may include five hundred bits (which can be expressed as 500 bits/chip). The second data 106 stored in the second storage circuit 30 may include one hundred bits with logical value "1" (which can be expressed as 100 bits/chip). Therefore, through the address provided by the second data 106, one hundred bits can be selected from the five hundred bits of the first data 104 to form the target sequence P and serve as the final identity code 102.

As shown in FIG. 2A, the intra Hamming-distance (intra-HD) can show correlation between the five hundred bits of the first data 104, and the correlation coefficient μ is 11.62%. As shown in FIG. 2B, the correlation coefficient μ between the one hundred bits of the first data 104 selected through the address of the second data 106 (which forms the identity code 102 by the target sequence P) may be greatly reduced to 0.53%. The above simulation results show that, randomness of each the bits of the target sequence P may be increased through selection by the address provided by the second data 106, and uniqueness of the identity code 102 may thus be ensured.

On the other hand, as shown in FIG. 2A, the inter Hamming distance (inter-HD) can show the correlation between the logical value of each bit of the first data 104 stored in the first storage circuit 20 and other storage devices, wherein the correlation coefficient μ is 49.88%. As shown in FIG. 2B, after one hundred bits of the first data 104 are selected through the address of the second data 106, the correlation coefficient μ of the inter HD is 50.01%, which can still be maintained at a value of nearly 50%.

In the simulation settings related to FIGS. 2A and 2B, one hundred bits from the five hundred bits of the first data 104 are selected as the identity code 102, and the selection ratio is one-fifth. In examples of other aspects, different selection ratios can be adopted, such as one-tenth or one-twentieth. The lower the selection ratio, the more error bits in the first data 104 can be filtered out, and the higher error tolerance may be achieved.

Figure 3:
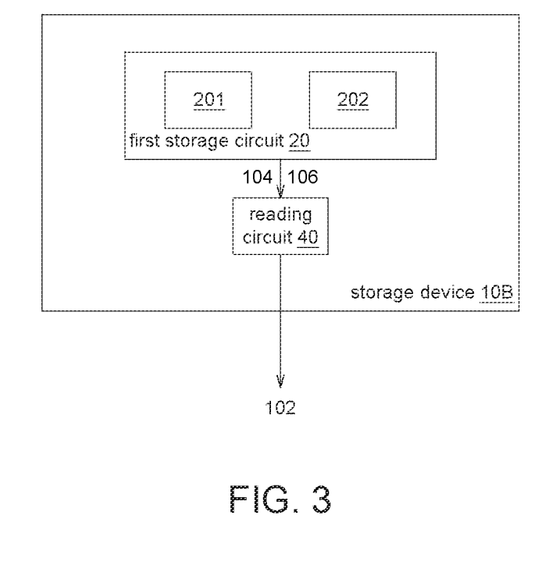
FIG. 3 is a block diagram of the storage device for generating an identity code according to the second embodiment of the present disclosure.

FIG. 3 is a block diagram of the storage device 10B for generating an identity code 102 according to the second embodiment of the present disclosure. Referring to FIG. 3, the storage device 10B of the second embodiment includes a first storage circuit 20 and a reading circuit 40. In the second embodiment, the storage device 10B may include only one physical storage circuit (the first storage circuit 20), and the first storage circuit 20 simultaneously stores the first data 104 and the second data 106. The first storage circuit 20 may be divided into a first storage region 201 and a second storage region 202 to store the first data 104 and the second data 106 respectively.

Figure 4A:
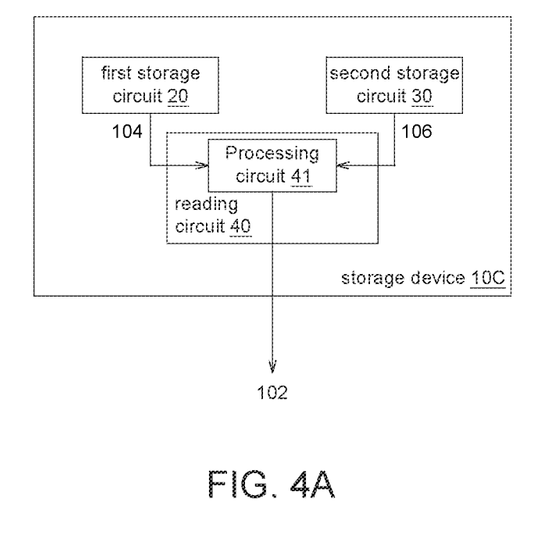
FIG. 4A is a block diagram of the storage device for generating an identity code according to the third embodiment of the present disclosure.
Figure 4B:
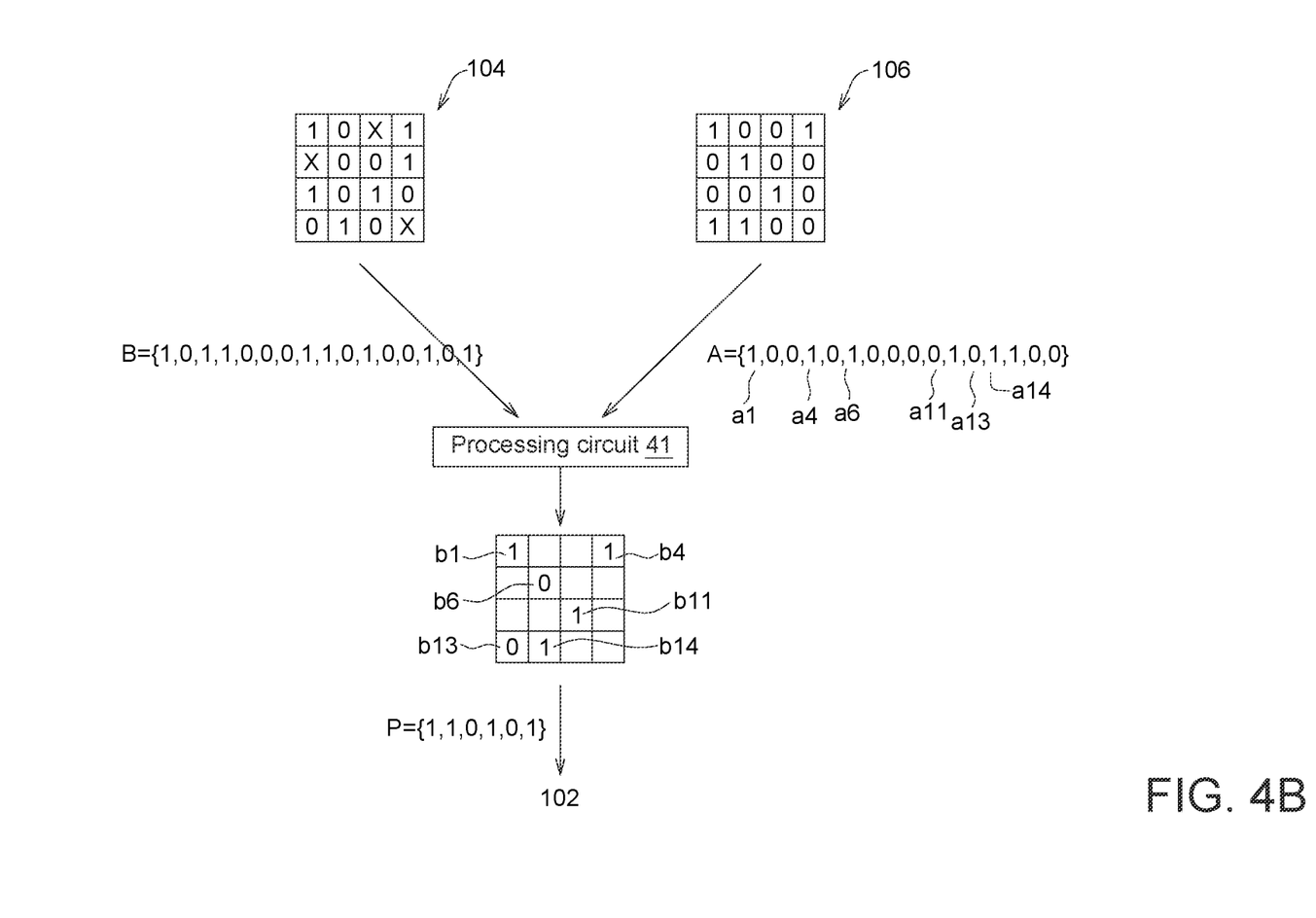
FIG. 4B is a schematic diagram illustrating the operation of the storage device to generate an identity code according to the third embodiment of the present disclosure.
Figure 8:
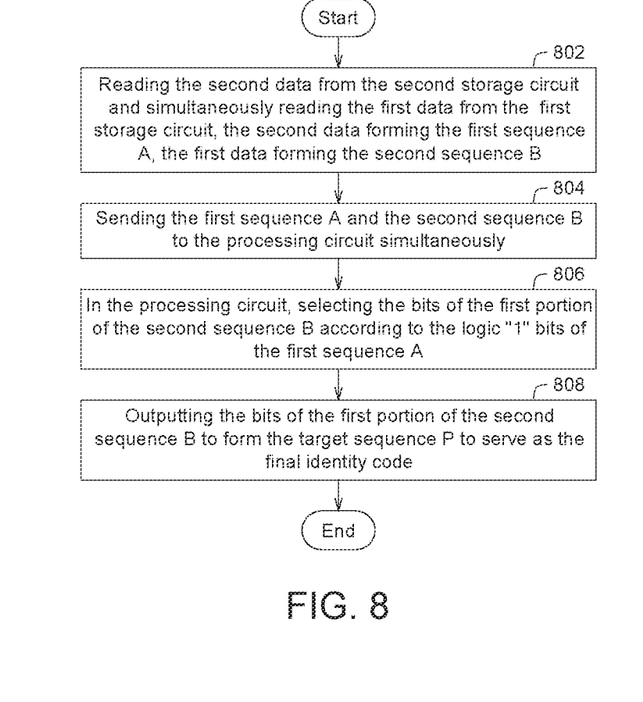
FIG. 8 is a flowchart of the identity code generating method according to the third embodiment of the present disclosure.

FIG. 4A is a block diagram of the storage device 10C for generating an identity code 102 according to the third embodiment of the present disclosure, and FIG. 4B is a schematic diagram illustrating the operation of the storage device 10C to generate an identity code 102 according to the third embodiment of the present disclosure. Furthermore, FIG. 8 is a flowchart of the identity code generating method 800 according to the third embodiment of the present disclosure. First, referring to FIG. 4A, the storage device 10C of the third embodiment may be different from the storage device 10A of first embodiment in that, the reading circuit 40 of the third embodiment reads the first data 104 from the first storage circuit 20 and simultaneously reads the second data 106 from second storage circuit 30 in a parallel manner.

Moreover, the reading circuit 40 of the third embodiment further includes a processing circuit 41. The first data 104 and second data 106 may be simultaneously transmitted to the processing circuit 41 for performing calculation.

Next, referring to FIG. 4B, in the operation of the storage device 10C of the third embodiment, the reading circuit 40 reads the second data 106 from the second storage circuit 30 to form the first sequence A and simultaneously reads the first data 104 from the first storage circuit 20 to form the second sequence B. The first sequence A may be expressed as {1, 0, 0, 1, 0, 1, 0, 0, 0, 0, 1, 0, 1, 1, 0, 0}, and the second sequence B may be expressed as {1, 0, 1, 1, 0, 0, 0, 1, 1, 0, 1, 0, 0, 1, 0, 1}. Also referring to FIG. 8, the above-mentioned operations of storage device 10C correspond to step 802 of the identity code generating method 800 of the third embodiment: reading the second data 106 from the second storage circuit 30, and reading the first data 104 from the first storage circuit 20 simultaneously. The second data forms the first sequence A, and the first data 104 forms the second sequence B.

Next, the first sequence A and the second sequence B are simultaneously transmitted to the processing circuit 41 to execute computation. This operation corresponds to the step 804 of the identity code generating method 800: transmitting the first sequence A and the second sequence B to the processing circuit 41 simultaneously.

In the processing circuit 41, bits of the first portion of the second sequence B are selected according to address of bits of logic value "1" of the first sequence A. On the other hand, bits of the second portion of the second sequence B correspond to bits of logic value "0" of the first sequence A, therefore the processing circuit 41 discards and not select bits of the second portion of the sequence B. As shown in FIG. 4B, the processing circuit 41 selects bits b1,b4,b6,b11, b13 and b14 of the first portion of the second sequence B which correspond to bits a1,a4,a6,a11,a13 and a14 of logic value "1" of the first sequence A. Furthermore, the processing circuit 40 masks bits of the second portion of the second sequence B, these bits are not selected. Also referring to FIG. 8, such operation corresponds to step 806 of identity code generating method 800: selecting bits of the first portion of the second sequence B according to address of bits of logic value "1" of the first sequence A.

Next, the processing circuit 41 outputs the selected bits b1,b4,b6,b11,b13 and b14 of the first portion of the second sequence B to form the target sequence P. The target sequence P may be expressed as {1, 1, 0, 1, 0, 1} to serve as the final identity code 102. This operation corresponds to step 808 of identity code generating method 800: outputting selected bits b1, b4, b6, b11, b13 and b14 of the first portion of the second sequence B to form the target sequence P, which serves as the final identity code 102.

As mentioned above, the operation of the storage device 10c of the third embodiment (corresponding to the identity code generating method 800 of the third embodiment) is different from the operation of the storage device 10A of the first embodiment (corresponding to the identity code generating method 700 of the first embodiment) in that: in the identity code generating method 700 of the first embodiment, the second data 106 is read from the second storage circuit 30 to form the first sequence A, thereafter, bits of the first portion of the first data 104 are selected according to address of bits of logic value "1" of the first sequence A. Then, selected bits of the first portion of the first data 104 are read from the first storage device 20, which serves as the final identity code 102. Unlike the first embodiment, in the identity code generating method 800 of the third embodiment, the second data 106 and the first data 104 are simultaneously read from the second storage circuit 30 and the first storage circuit 20, which form the first sequence A and the second sequence B. Thereafter, the first portion of the second sequence B is selected to be the final identity code 102.

Figure 4C:
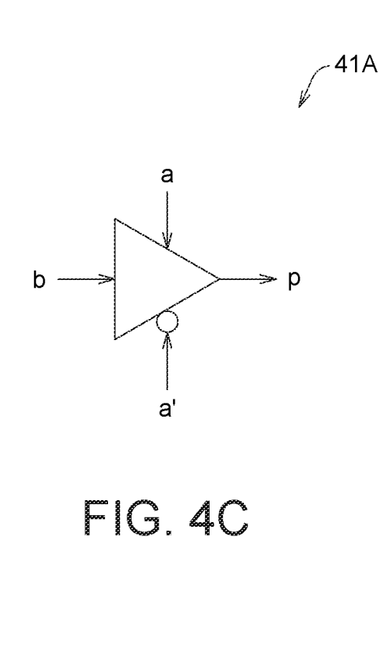
FIGS. 4C and 4D are circuit diagrams of two examples of processing circuits of the storage device according to the third embodiment of the present disclosure.
Figure 4D:
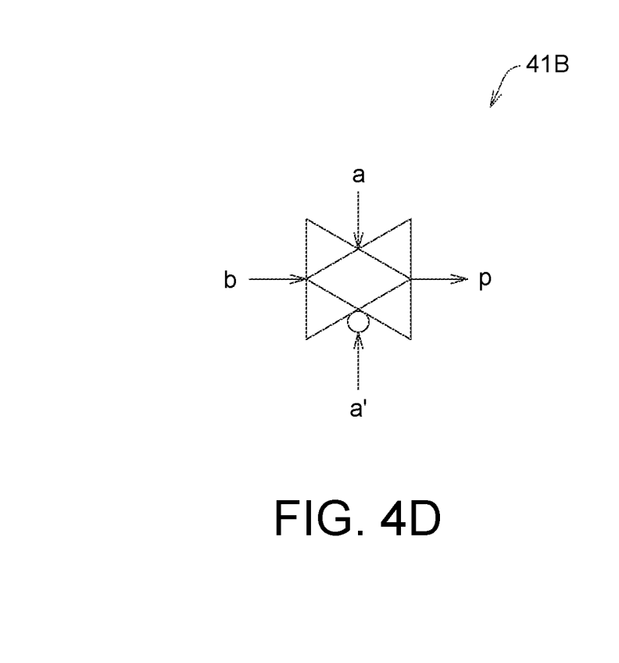

FIGS. 4C and 4D are circuit diagrams of two examples of different aspects of processing circuits 41A and 41B of the storage device 10C according to the third embodiment of the present disclosure. The processing circuit 41A and processing circuit 41B may be logic circuits composed of logic gates, such as latches or flip-flops. The processing circuit 41A and processing circuit 41B may be configured to select bits "b" of the second sequence B by the bits "a" and their complements "a'" of the first sequence A, and then forms bits "p" of the target sequence P.

Figure 5:
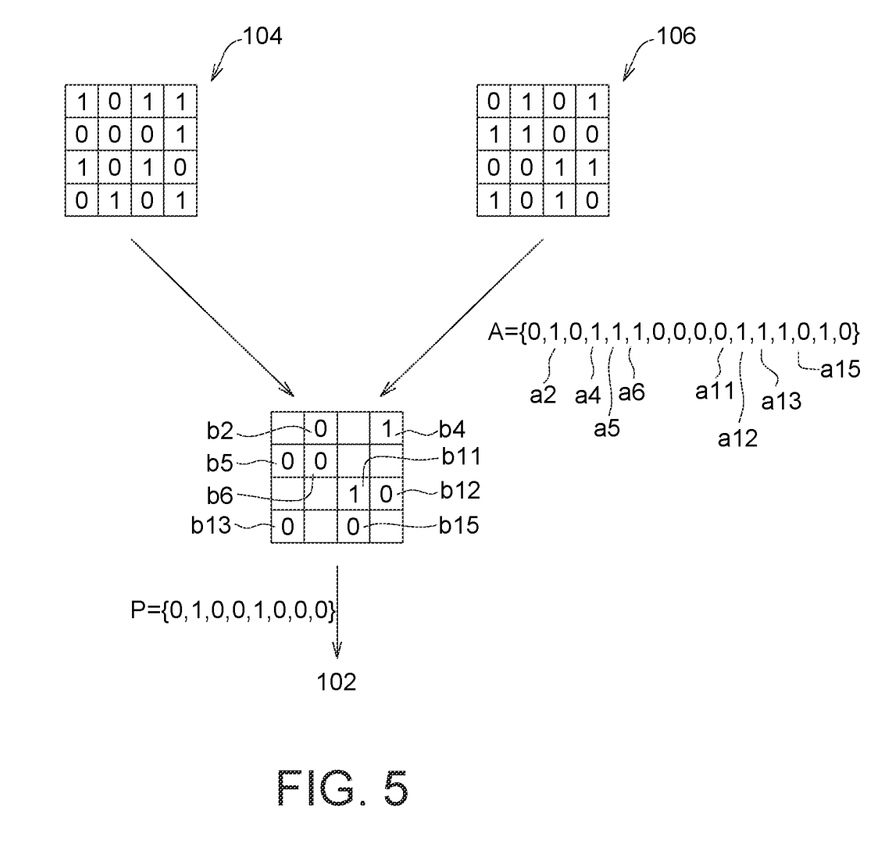
FIG. 5 is a schematic diagram illustrating the operation of the storage device to generate an identity code according to the fourth embodiment of the present disclosure.

FIG. 5 is a schematic diagram illustrating the operation of the storage device to generate an identity code 102 according to the fourth embodiment of the present disclosure. Referring to FIG. 5, the storage device of the fourth embodiment is different from the storage device of the first embodiment in that, logic value of each bit of the second data 106 of the first embodiment is defined and programmed by the user in advance. On the other hand, logic value of each bit of the second data 106 of the fourth embodiment is randomly distributed, which is not defined by the user. In other words, the logic values of the bits of the first data 104 and the second data 106 in the fourth embodiment are randomly distributed. Using the randomly distributed address provided by the second data 106 to select the randomly distributed information of the first data 104, the randomness is increased to two dimensions for the fourth embodiment, which can ensure uniqueness of the identity code 102 formed by the selected bits of the first portion of the first data 104. For example, the first sequence A, which is read from the randomly distributed second data 106. is {0, 1, 0, 1, 1, 1, 0, 0, 0, 0, 1, 1, 1, 0, 1, 0}. Furthermore, the selected first portion from the first data 104 according to the address provided by the first sequence A may form the target sequence P={0, 1, 0, 0, 1, 0, 0, 0} to obtain the final identity code 102. In operation, in step 702 of FIG. 7, firstly, it is determined whether the logical value of each bit of the second data 106 should be programmed and defined by the user. If not, the second storage circuit 30 directly generates random logic value of each bit of the second data 106 in a random manner according to the physical characteristics of the second storage circuit 30, which may not need to program each bit of the second data 106. Therefore, step 704 can be skipped, and step 706 can be executed directly to read the randomly distributed second data 106 from the second storage circuit 30 directly, forming the first sequence A.

Figure 6:
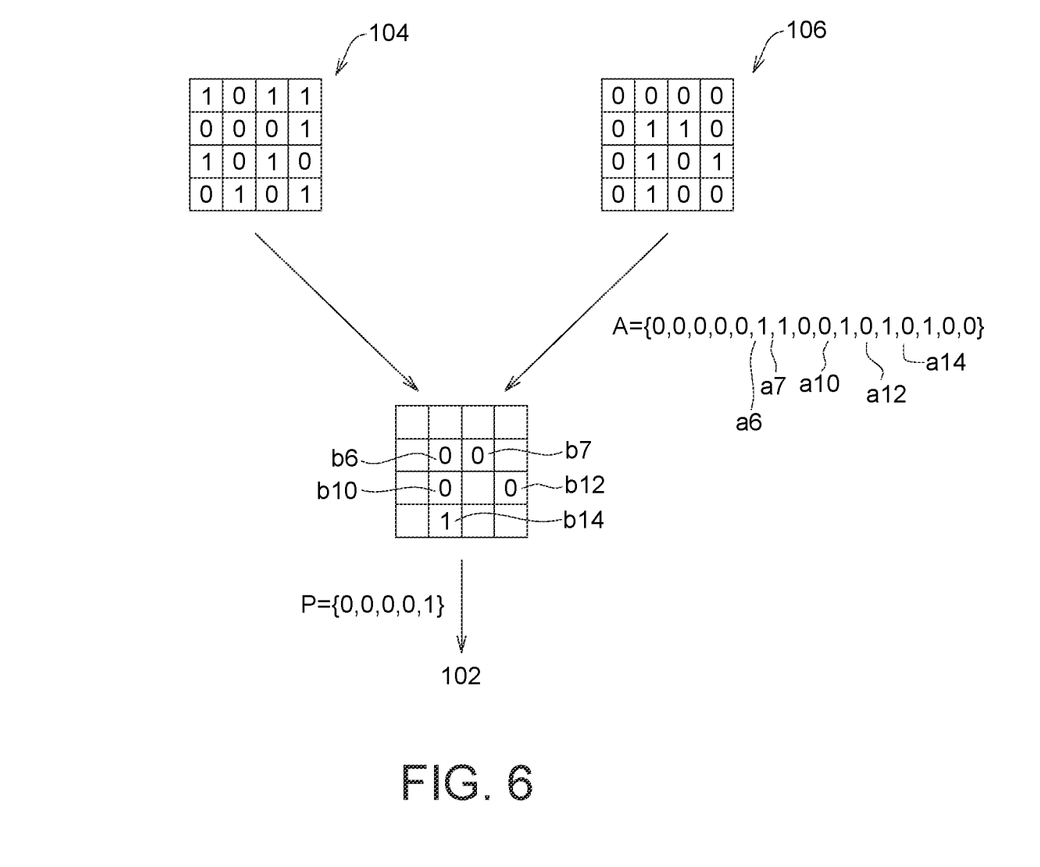
FIG. 6 is a schematic diagram illustrating the operation of the storage device to generate an identity code according to the fifth embodiment of the present disclosure.

FIG. 6 is a schematic diagram illustrating the operation of the storage device to generate an identity code 102 according to the fifth embodiment of the present disclosure. Referring to FIG. 6, in the fifth embodiment, the user may re-program the second data 106 during the process so as to re-define the logic value of each bit of the second data 106, thereby re-defining the address provided by the first sequence A. Hence, other bits of the first data 104 may be re-selected as a new target sequence P to generate a new identity code 102. In other words, in the fifth embodiment, the identity code 102 may be changed again during process. In operation, in step 714 of FIG. 7, it is determined whether the user needs to re-program the second data 106. If yes, executing step 704 to program the logic value of each bit of the second data 106. Next, in step 706, the re-defined and re-programmed second data 106 is read to form a new first sequence A={0, 0, 0, 0, 0, 1, 1, 0, 0, 1, 0, 1, 0, 1, 0, 0}. Next, in step 708, re-selecting five bits b6, b7, b10, b12 and b14 from the first data 104 according to the new first sequence A so as to obtain a new target sequence P={0, 0, 0, 0, 1} to form a updated identity code 102.

According to the technical solutions of the above-mentioned embodiments of the present disclosure, the first portion of the first data 104 is selected with the aid of the address provided by the first sequence A formed by the second data 106, so as to generate the final identity code 102. In addition, the second portion of the first data 104 is discarded, so that error bits in the second portion of the first data 104 may be tolerated, and hence uniqueness of the final identity code 102 may be further ensured. The first sequence A formed by the second data 106 can be pre-defined by the user or randomly distributed, and furthermore, the second sequence can also be re-programmed and re-defined by the user during process, so that coding mechanism of the identity code 102 may be more flexible, and uniqueness of the identity code 102 may be ensured. The above refers to technical effects achieved by the technical solution of the present disclosure.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A storage device for generating an identity code, comprising:
   a first storage circuit for storing a plurality of first data, the first data having a plurality of bits;
   a second storage circuit for storing a plurality of second data, the second data having a plurality of bits; and
   a reading circuit for reading the second data from the second storage circuit to form a first sequence, and simultaneously reading the first data from the first storage circuit to form a second sequence, the reading circuit further comprises:
      a processing circuit for simultaneously receiving the first sequence and the second sequence, utilizing a tri-state buffer of the processing circuit to select a first portion of the second sequence to form a target sequence according to the first sequence, wherein the tri-state buffer is turned ON in response to bits in the first sequence, so as to pass corresponding bits in the first portion of the second sequence to form the target sequence, and outputting the target sequence to serve as an identity code,
   wherein, logical values of the bits of the first data are randomly distributed, and logical values of the bits of the second data are pre-defined by a user or randomly distributed.

2. The storage device according to claim 1, wherein the second sequence further comprises a second portion, and the processing circuit discards error bits in the second portion of the second sequence.

3. The storage device according to claim 1, wherein, logical values of the bits of the second data are pre-defined by the user, bits of logic value "1" of the first sequence are pre-defined by the user, and the processing circuit selects the first portion of the second sequence according to an address of the bits of logic value "1" of the first sequence.

4. The storage device according to claim 1, wherein, logical values of the bits of the second data are re-programmed, the reading circuit reads the second data from the second storage circuit to form a re-programmed first sequence, the processing circuit re-selects a first portion of the second sequence according to the first sequence, the re-selected first portion of the second sequence forms the target sequence.

5. The storage device according to claim 1, wherein, the logical values of the bits of the second data are randomly distributed, bits of logic value "1" of the first sequence are randomly distributed, and the processing circuit selects the first portion of the second sequence according to the address of the bits of logic value "1" of the first sequence.

6. An identity code generating method, which is applied to a first storage circuit and a second storage circuit, the first storage circuit storing a plurality of first data, the second storage circuit storing a plurality of second data, the identity code generating method comprises:
   reading the second data from the second storage circuit to form a first sequence, wherein the second data have a plurality of bits, logic values of the bits are pre-defined by a user or randomly distributed;
   reading the first data from the first storage circuit to form a second sequence, wherein the first data have a plurality of bits, logic values of the bits are randomly distributed;
   transmitting the first sequence and the second sequence to a processing circuit simultaneously;
   selecting, using the processing circuit, a first portion of the second sequence to form a target sequence according to the first sequence; and
   outputting the target sequence to serve as an identity code.

7. The identity code generating method according to claim 6, wherein, the second sequence further comprises a second portion, the identity code generating method further comprises:
   discarding error bits in the second portion of the second sequence.

8. The identity code generating method according to claim 6, further comprises:
   pre-defining the logical values of the bits of the second data, and making bits of logic value "1" of the first sequence pre-defined; and
   selecting the first portion of the second sequence according to an address of bits of logic value "1" of the first sequence.

9. The identity code generating method according to claim 6, further comprises:
   re-programming the logic values of the bits of the second data;
   reading the second data from the second storage circuit to form a re-programmed first sequence;
   re-selecting, using the processing circuit, a first portion of the second sequence according to the first sequence; and
   forming the re-selected first portion of the second sequence as the target sequence.

10. The identity code generating method according to claim 6, wherein, the logical values of the bits of the second data are randomly distributed, the identity code generating method further comprises:
   selecting the first portion of the second sequence, using the processing circuit, according to the address of the bits of logic value "1" of the first sequence, wherein bits of logical value "1" of the first sequence are randomly distributed.

* * * * *